United States Patent
Husted

[19]

[11] Patent Number: 5,813,726
[45] Date of Patent: Sep. 29, 1998

[54] INERTIA LOCKING DEVICE FOR A VEHICLE SEAT ADJUSTMENT MECHANISM

[75] Inventor: David W. Husted, Ann Arbor, Mich.

[73] Assignee: Hoover Universal, Inc., Plymouth, Mich.

[21] Appl. No.: 801,199

[22] Filed: Feb. 18, 1997

[51] Int. Cl.⁶ .................................................. B60N 2/02
[52] U.S. Cl. .................................. 297/378.11; 296/68.1; 248/429; 297/344.1; 297/216.18
[58] Field of Search ........................... 297/216.18, 344.1, 297/341, 378.11; 296/68.1, 65.13; 248/429, 424

[56] References Cited

U.S. PATENT DOCUMENTS

| | | | |
|---|---|---|---|
| 4,781,354 | 11/1988 | Nihei et al. | 248/424 X |
| 5,052,751 | 10/1991 | Hayakawa et al. | 248/429 X |
| 5,076,529 | 12/1991 | Dove et al. | 296/68.1 X |
| 5,154,476 | 10/1992 | Haider et al. | |
| 5,234,189 | 8/1993 | Myers | 248/429 |
| 5,348,373 | 9/1994 | Stiennon | 297/344.1 |
| 5,425,522 | 6/1995 | Retzlaff | 248/429 |
| 5,567,013 | 10/1996 | Chang | 297/344.1 X |

*Primary Examiner*—Peter M. Cuomo
*Assistant Examiner*—Stephen Vu
*Attorney, Agent, or Firm*—Harness, Dickey & Pierce, P.L.C.

[57] ABSTRACT

An inertia locking device for use in a mechanical seat adjuster such as a fore and aft adjustment mechanism or a recliner mechanism in which a latch member is moved to a release position to enable the seat adjustment. The inertia locking device automatically re-locks the adjustment mechanism in the event of a vehicle collision even while the adjustment mechanism operating handle has been moved to a release position.

16 Claims, 4 Drawing Sheets

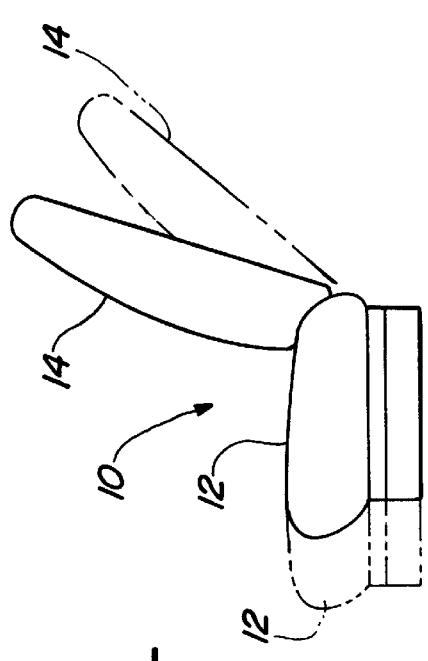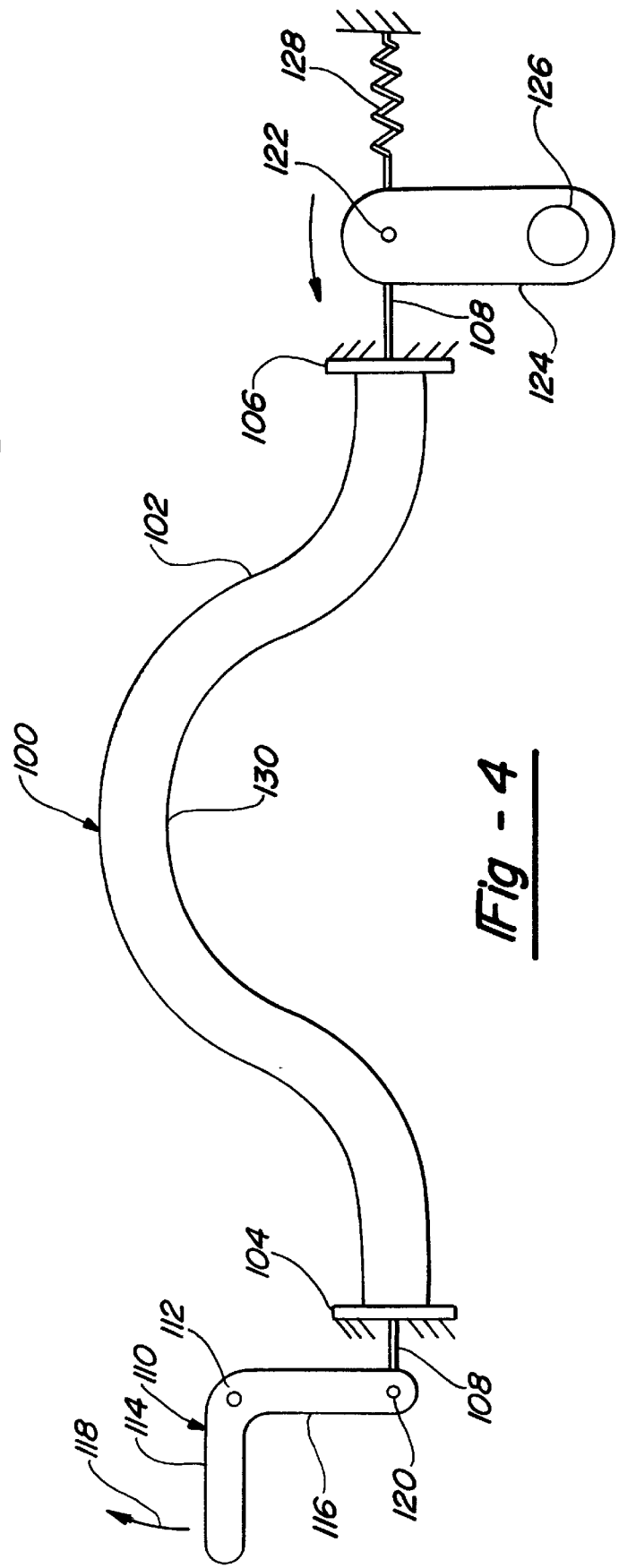

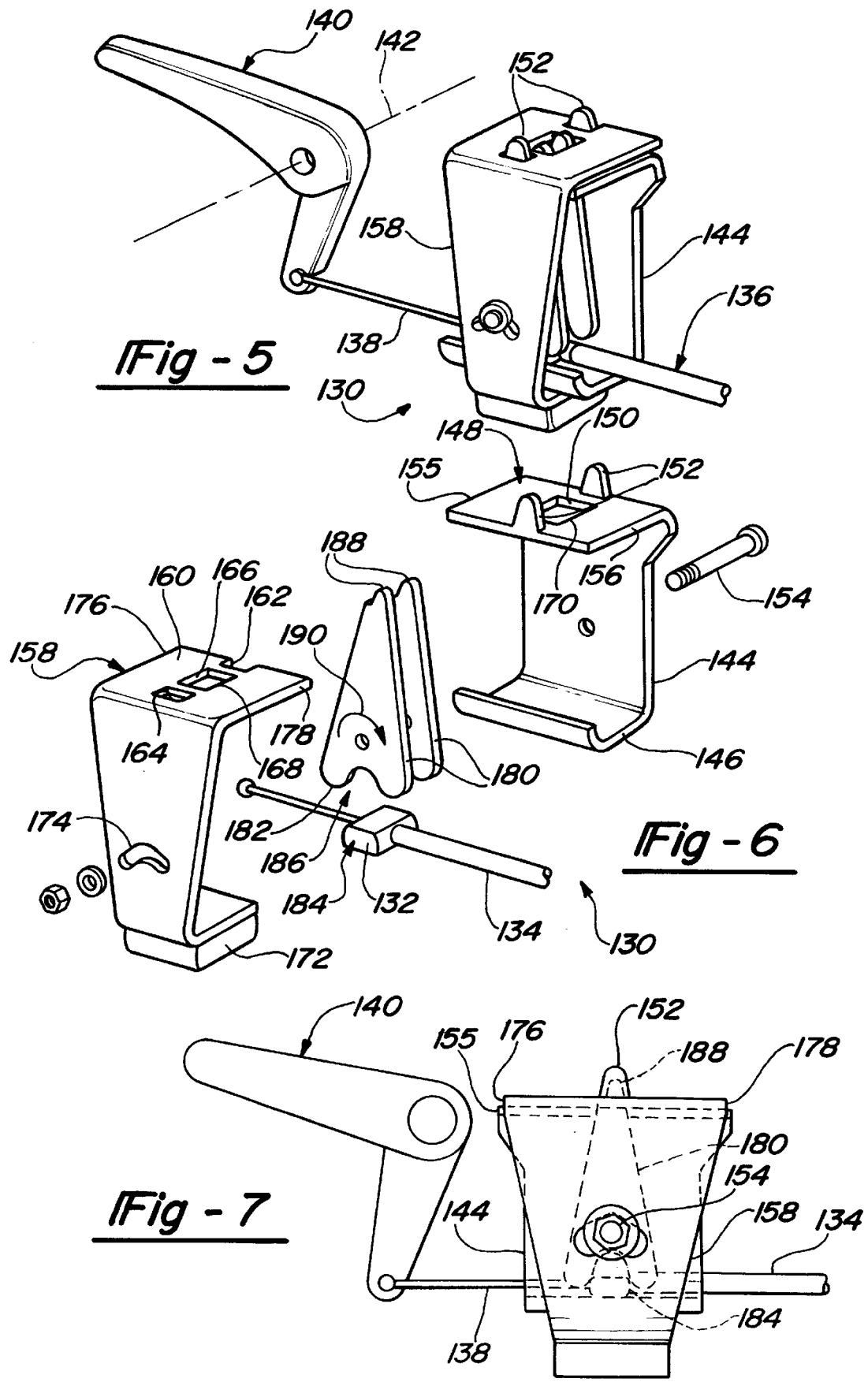

INERTIA LOCKING DEVICE FOR A VEHICLE SEAT ADJUSTMENT MECHANISM

BACKGROUND AND SUMMARY OF THE INVENTION

The present invention relates to adjustment mechanisms for vehicle seats such as a fore and aft seat adjuster or a seat back recliner and in particular to an inertia locking device for the adjustment mechanism.

Vehicle seat assemblies are typically equipped with fore and aft adjuster to move the seat fore and aft relative to the vehicle body in which it is installed. In addition, many vehicle seat assemblies have a recliner to adjust the angle of the seat back relative to the lower seat cushion. In this specification and the following claims, the term "adjustment mechanism" is used to refer to both a fore and aft seat adjuster and a seat back recliner.

Many manually operated adjustment mechanisms employ a latch member which is movable between a latched position and a released position. In the latched position, the latch member engages another part of the vehicle seat to prevent relative movement of the seat components. The latch member is movable to a release position, out of engagement, to enable the seat component to be adjusted. During the process of making a seat adjustment, the adjustable component of the seat is free to move.

It is an object of the present invention to provide a locking device which will automatically lock the adjustment mechanism in the event of a vehicle collision that occurs while the seat is in the process of being adjusted.

The locking device of the present invention is inertia actuated to reengage or lock the adjustment mechanism in the event of a vehicle collision. The inertia locking device of the present invention is operable with a pull cable release for the adjustment mechanism and, upon a vehicle collision, the inertia locking device will release one end of the pull cable sleeve, allowing the adjustment mechanism to reengage and lock the adjustable seat component in place. While the invention is described and shown in the context of both a fore and aft seat adjuster and a seat back recliner, it can be incorporated into any seat adjustment mechanism that includes engagable latch members.

Further objects, features and advantages of the invention will become apparent from a consideration of the following description and the appended claims when taken in connection with the accompanying drawings.

BRIEF DESCRIPTION OF THE DRAWINGS

FIG. 1 is a schematic side view of a vehicle seat assembly showing the fore and aft seat adjustment and the recliner adjustment;

FIG. 4 is a schematic view illustrating the operation of a pull cable;

FIG. 5 is a perspective view of the inertia locking device;

FIG. 6 is an exploded perspective view of the inertia locking device of FIG. 5;

FIG. 7 is a side elevation view of the inertia locking device of FIG. 5;

DETAILED DESCRIPTION OF THE PREFERRED EMBODIMENT

With reference to FIG. 1, a typical vehicle seat is shown and designated generally at 10. The vehicle seat 10 includes a hortizontal seat cushion 12 and a generally upright seat back 14 extending upwardly at the rear end of the seat cushion. The seat back 14 is adjustable to vary its angular position relative to the seat cushion as shown by the broken line position of the seat back. Furthermore, the seat cushion and seat back can be moved fore and aft as shown by the broken line position of the seat cushion 12.

Figure 2:
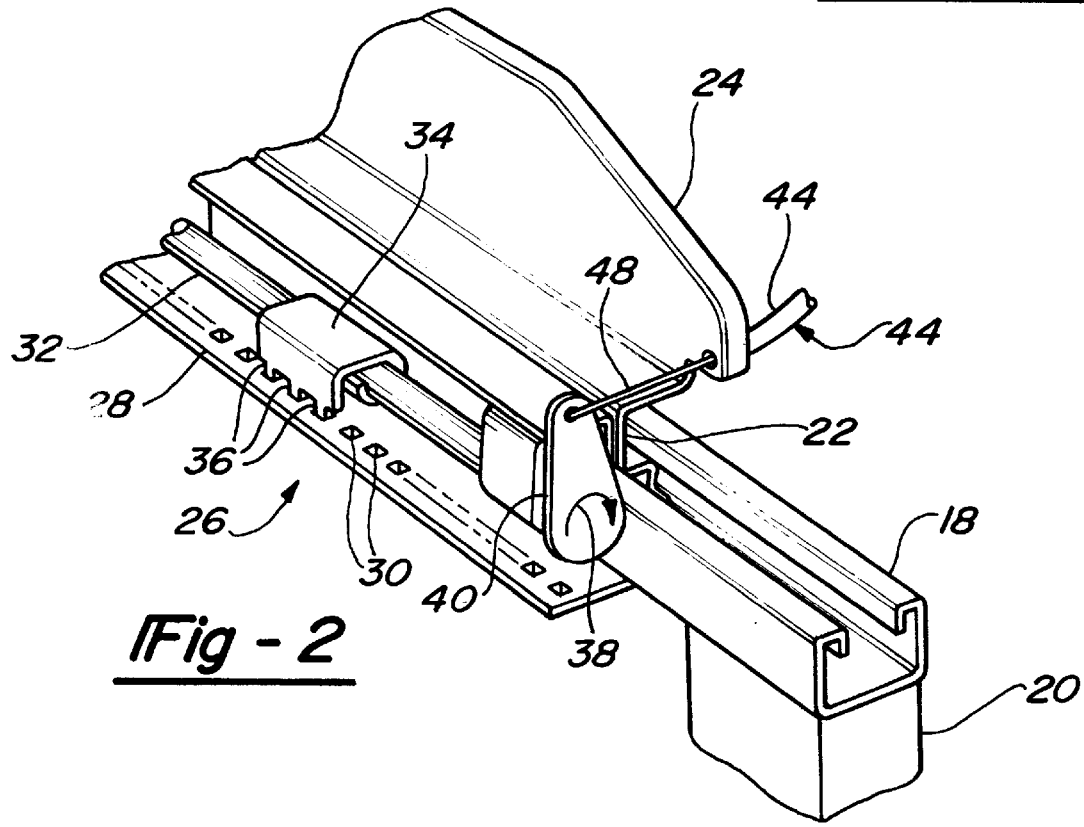
FIG. 2 is a perspective view illustrating a fore and aft seat adjustment mechanism for use with the inertia locking device of the present invention.
Figure 8:
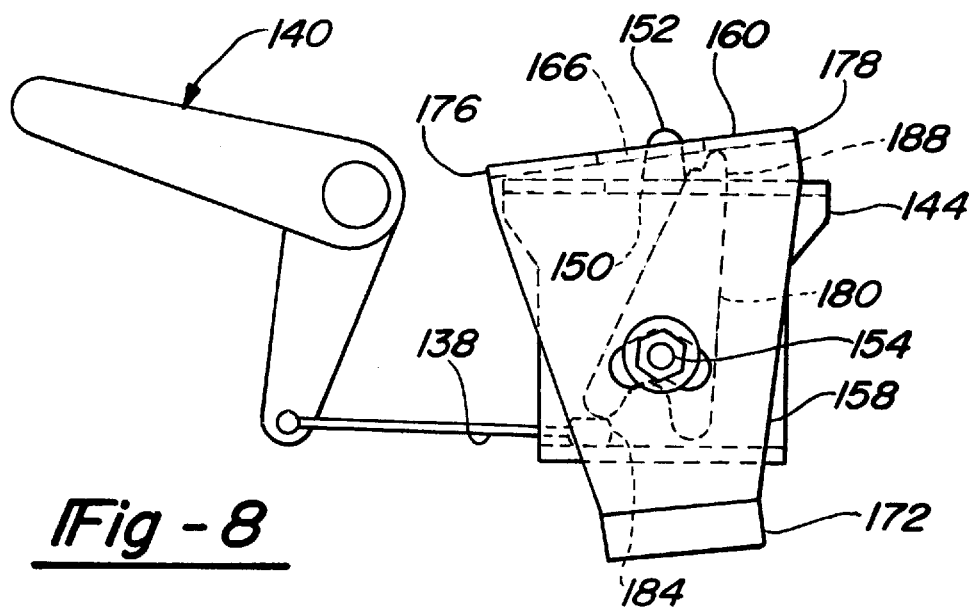
FIG. 8 is a side elevation view of the inertia locking device in a release position.
Figure 9:
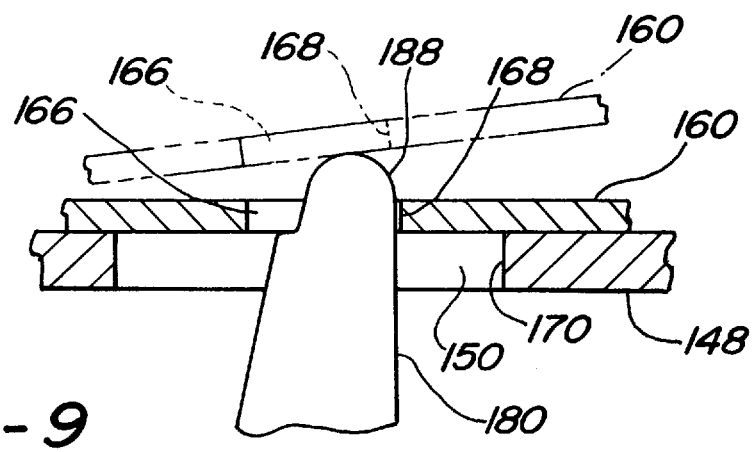
FIG. 9 is an enlarged side sectional view showing release of the inertia member.

With reference to FIG. 2, a fore and aft seat adjuster is shown. The seat adjuster includes a lower rail 18 which is attached to a vehicle body through a pedestal or other mount 20. The lower rail 18 extends in a fore and aft direction. An upper rail 22 is mounted to the lower rail 18 for fore and aft movement thereon. A vehicle seat typically has a pair of lower rails 18 and a pair of upper rails 22. A riser 24 typically extends upward from each upper rail. The seat cushion 12 and seat back 14 are mounted to the risers.

A latch mechanism 26 holds the upper rail 22 in a given position relative to the lower rail 18. The latch mechanism includes a latch plate 28 attached to the lower rail 18. The latch plate has an array of apertures 30. A rod 32 rotatably mounted to the upper rail 22 carries a latch pawl or latch member 34. The latch member 34 has a plurality of teeth 36 which are sized to be received within the apertures 30 in the latch plate. The latch member 34 is movable by rotating the rod 32 between a latched position and a released position. In the latched position, the teeth 36 extend into the apertures 30 of the latch plate and thus hold the upper rail in a fixed position relative to the lower rail. By rotating the rod 32 in the direction of the arrow 38, the latch member is moved to the released position in which the teeth 36 are withdrawn from the apertures in the latch plate.

A pivot lever 40 is fixed to the rod 32 and extends radially therefrom. A spring coupled to the pivot lever or rod 32 biases the pivot lever, the rod and the latch member into the engaged position of the latch member. A pull cable 44 is pulled to release the latch mechanism by rotating the rod and latch member to the released position. The pull cable 44 has a sheath 46 housing a wire 48. One end of the sheath 46 is anchored to the riser 24 while the wire 48 extends beyond the sheath and is coupled to the pivot lever 40. By pulling on the wire 48, the pivot lever and rod is rotated, in opposition to the bias spring 42, to withdraw the teeth 36 of the latch member from the apertures 30 in the latch plate. With the latch member in the released position, the upper rails are free to move relative to the lower rails and adjust the fore and aft position of the seat relative to the lower rails and to the vehicle body.

Figure 3:
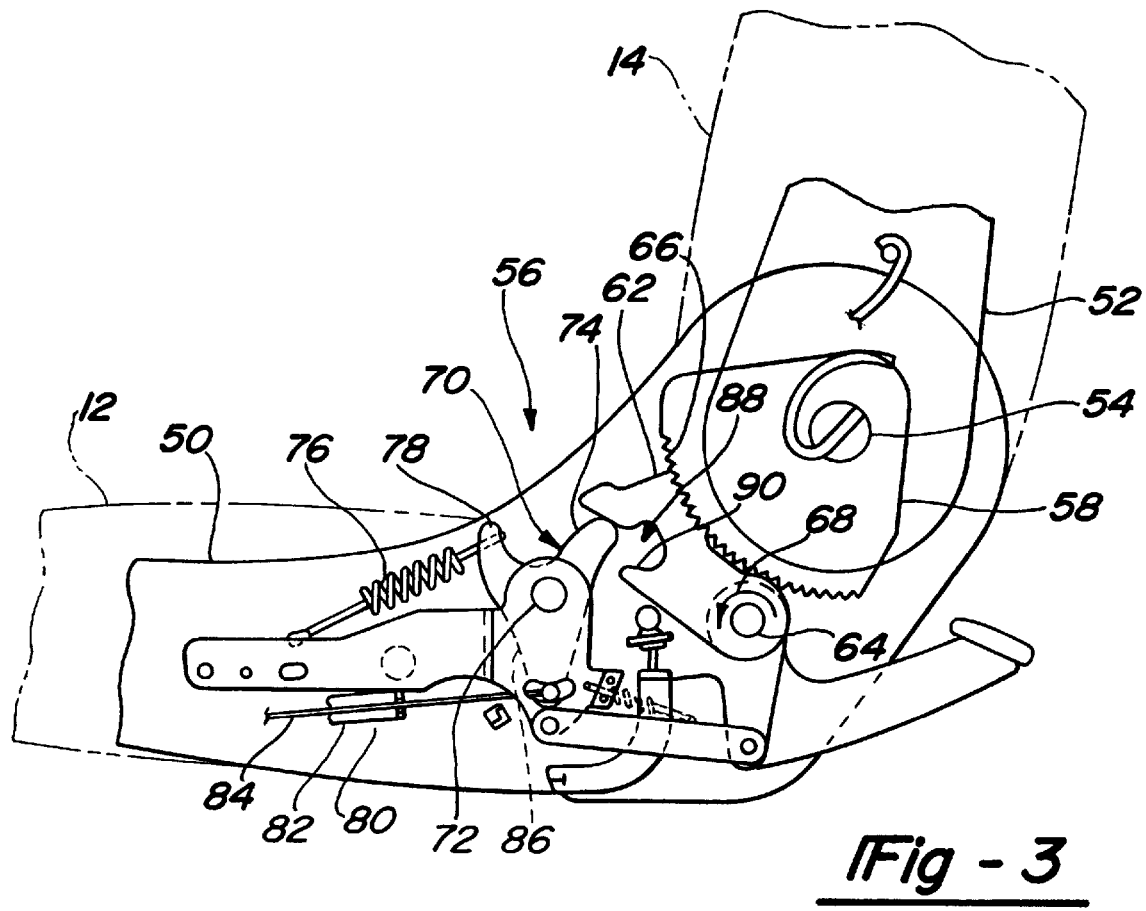
FIG. 3 is side elevational view of an seat back recliner for use with the inertia locking mechanism of the present invention.

With reference to FIG. 3, a seat back recliner is shown. The seat assembly 10 includes a riser 50 similar to the riser 24 shown in FIG. 2 to which the seat cushion 12 and seat back 14 are attached. The seat back 14 includes a seat back frame 52 that is pivotally attached to the riser for rotation about the pivot pin 54.

A recliner mechanism 56 is provided to hold the seat back in a given angular position relative to the seat cushion and to enable adjustment of the seat back angular position. The recliner mechanism includes a sector gear 58 which is affixed to the seat back frame 52. The sector gear 58 has a plurality of teeth 60 about a portion of its periphery arranged in a circular arc that is concentric about the pivot pin 54. A latch member or pawl 62 is pivotally attached to the riser for rotation about a pivot 64. The latch member 62 has a plurality of teeth 66 along a portion of its periphery and is arcuate and complementary to the sector gear teeth 60. When the pawl teeth engage the sector gear teeth, the seat back frame is held in place. Likewise, when the pawl is rotated counter-clockwise, as viewed in FIG. 3, in the direction of arrow 68, the latch member 62 is released from the sector gear, enabling the sector gear and seat back to rotate about the pivot pin 54.

The latch member 62 is held in place by a cam 70. Cam 70 is mounted to the riser for rotation about the pivot 72. Cam 70 is generally Y-shaped having three extending legs. The leg 74 engages the latch member 62 on an edge surface opposite from the teeth 66 and holds the pawl in its engaged position with the sector gear. The spring 76 biases the cam 70 in the counter-clockwise direction, as viewed in FIG. 3, to maintain the leg 74 in engagement with the latch member 62. Spring 76 is coupled to cam leg 78.

A pull cable 80 is used to release the recliner. Pull cable 80 includes a sheath 82 one end of which is anchored to the riser 50. The cable further includes a wire 84 which extends beyond the end of the sheath and is coupled to the cam leg 86. By pulling on the wire 84, the cam 70 is rotated clockwise, in opposition to the spring 76. This lowers the cam leg 74 into the recessed portion 88 of the latch member, enabling the latch member to rotate to the released position due to gravity. To insure rotation of the latch member, the cam leg 74 will contact the extending release leg 90 of the latch member, forcing the latch member to rotate to the released position. Upon release of the tension in the wire 84, the spring 76 will return the cam to a lock position in which it forces the latch member 62 into engagement with the sector gear to hold the seat back in place.

In both the latch mechanism 26 shown in FIG. 2 and the recliner mechanism shown in FIG. 3, when the mechanism is released for adjustment, the seat component is free to move unrestrained. The inertia locking device of the present invention will return each adjustment mechanism to its engaged, locking condition in the event of a vehicle collision. The inertia locking device of the present invention operates in connection with the pull cable that is used to release each mechanism. The fore and aft seat adjuster and the recliner are examples of many such mechanisms that could be used with the inertia locking device of the present invention. The invention is not limited to the specific adjustment mechanisms shown and described herein.

Operation of a pull cable is shown schematically in FIG. 4. A pull cable 100 is illustrated that includes a sheath 102 having ends 104 and 106 which are fixed in position. A wire 108 extends through the sheath 102 and beyond the sheath ends. An actuating handle 110 is rotatable about a pivot 112 and has two radially extending legs 114 and 116. The leg 116 is coupled to the wire 108 and the leg 114 serves as the grip for the handle 110. By pulling upward on the leg 114 in the direction of the arrow 118, the wire 108 is displaced relative to the sheath 102. The wire end 120 is moved away from the sheath end 104. This causes the opposite wire end 122 to move toward the opposite sheath end 106. This results in rotation of the attached lever 124 about its pivot 126. Upon release of the handle 110, a spring 128 returns the wire and lever 124 to their original positions.

The cable properly functions because the distance between the two sheath ends 104 and 106 is a fixed distance equal to the length of the sheath 102. The length of wire necessary to extend through the sheath 102 is likewise fixed. As the wire end 102 moves further away from the sheath end 104, the opposite wire end 122 must move closer to the sheath end 106. If one end of the sheath is released from its rigid attachment after the handle 110 has been actuated by pulling in the direction of arrow 118, the sheath will slide relative to the cable. This reduces the extent of the bend 130 in the sheath. This shortens the path through the sheath, between the two ends of the wire 108. This allows the spring 128 to return the lever 124 to its original position, even while the handle 110 is rotated to an actuated or pulled position.

The inertia locking device of the present invention releases one end of the cable sheath in the event of a vehicle collision. This enables the return spring to re-engage or re-lock an adjustment mechanism that has been released. The inertia locking device of the present invention is shown in FIGS. 5 through 9 and is designated generally at 130. Inertia locking device 130 operates on one end 132 of the sheath 134 of a pull cable 136. The pull cable includes a wire 138 coupled to one leg of an actuating handle 140.

The device 130 further includes a base member 144 which is rigidly mounted to the seat structure, such as a riser 24 or 50 as described above. The handle 140 is attached to the same seat structure as the base 144 for rotation about an axis 142. The base 144 includes a lower wall 146 upon which the sheath end 132 is placed. Base 144 further includes an upper wall 148. The upper wall has an aperture 150 and a pair of upwardly extending tabs 152, one on each transverse side of the aperture 150. A generally horizontal pivot pin 154 is also mounted to the base 144 and extends transversely across the base. The device is oriented in the vehicle such that the edge 155 of the upper wall is oriented toward the front of the vehicle while the edge 156 of the upper wall is oriented toward the rear of the vehicle.

An L-shaped inertia release member 158 is placed around the base 144. The release member 158 has an upper wall 160 that rests on top of the base upper wall 148. The wall 160 includes a pair of slots 162 and 164 through which the tabs 152 of the base extend. The tabs 152 position the inertia release member upon the base. The release member upper wall 160 includes an aperture 166 which is smaller than the aperture 150 of the base 144. As a result, the rear edge 168 of aperture 166 is located forward of the rear edge 170 of the base member aperture 150.

The inertia release member extends downward and has a weight 172 at its lower end, beneath the base lower wall 146. The pivot pin 154 extends through an arcuate slot 174 in the inertia release member. During a frontal or rear vehicle collision, the weight 172 at the bottom of the inertia release member will cause it to rotate. During a rear impact, the weight 172 moves rearward, causing the release member to rotate counter clockwise, (FIG. 7) about the front edge 176 of its upper wall 158. The rear edge 178 will be lifted from the upper wall of the base. Conversely, during a front impact collision, the weight moves forward and the inertia release member rotates about the rear edge 178 of its upper wall. The front edge of 176 is lifted from the base member.

The end 132 of the pull cable is held in place by a pair of pawls 180. The lock pawls are shown as separate elements but can be joined together as an integral body. The lock pawls have a generally forked lower end 182. An enlarged head 184 at the sheath end 132 is retained within the recess 186 formed by the forked lower end of the pawls. The pawls are mounted for rotation about the pivot pin 154. The upper ends 188 of the pawls extend upward through the apertures 150 and 166 in the base and the inertia release member upper walls.

When the actuating handle 140 is raised pulling on the wire 138 the enlarged head 184 of the cable sheath is urged forward along with the wire. This applies a forward force at the lower end of the pawls, urging the pawls to rotate in a clockwise direction shown by the arrow 190 in FIG. 6. Because the upper ends 188 of the pawls rest against the edge 168 of the release member aperture 166, rotation of the pawls is resisted. The force from the pawls acting on the upper wall of the inertia release member is generally aligned radially or closely aligned radially to the axis of rotation of the inertia release member. According, a very low moment or no moment is applied to the inertia release member by the pawls. As a result, the inertia release member does not rotate in response to the force from the pawls. Instead, the force is resisted by the tabs 152 extending through the slots 162 and 164 in the inertia release member. The tabs prevent the inertia release member from sliding rearward across the upper wall 148 of the base.

In the event of a vehicle collision, either a front or a rear impact, while a seat adjustment mechanism is in the process and the handle 140 has been actuated, the inertia release member 158 will rotate about either its front or rear edge, depending upon the direction of the vehicle collision. This rotation will raise the rear edge 168 of the release member aperture 166 above the upper ends 188 of the pawls. Once this occurs, the pawls rotate about the pivot 154 in the direction of the arrow 190. This releases the end 132 of the cable sheath, allowing the sheath end to move and a bend in the cable to be reduced. As a result, the latch mechanism is returned to an engaged position by its return spring. The rear edge 168 of the aperture 166 is preferable located equidistant from both the front edge 176 and the rear edge 178 of the release member upper wall. This allows the inertia locking device to be actuated in both front and rear collisions of equal impact.

Following a collision and release of the cable sheath, the mechanism will reset itself upon release of the handle 140. This enables the sheath 134 to return to its original position. In doing so, the pawls will be returned to their upright position and enable the inertia release member to resume its vertical orientation with the upper ends 188 of the pawls extending through the aperture 166 in the inertia release member.

It is to be understood that the invention is not limited to the exact construction illustrated and described above, but that various changes and modifications may be made without departing from the spirit and scope of the invention as defined in the following claims.

We claim:

1. A vehicle seat assembly comprising:

a first section;

a second section coupled to and movable relative to the first section;

latch means for holding the second section in place relative to the first section, the latch means including a latch member carried by one of the first and second sections, the latch member being movable between a latched position and a released position, the latch member engaging the other of the first and second sections in a latching relationship when in the latched position to hold the second part in place relative to the first part and the latch member being disengaged from the other of the first and second sections to enable movement of the second part relative to the first part when in the released position, the latch means including bias means for urging the latch member into the latched position;

release means for selectively moving the latch member to the released position to enable movement of the second part relative to the first part when the release means is actuated; and inertia responsive means for overriding the release means in response to a vehicle collision occurring when the release means is actuated and the latch member is in the released position, the inertia responsive means overriding the release means to enable the latch member to return to the latched position even though the release means is actuated.

2. The vehicle seat of claim 1 wherein the first section is a fore and aft extending fixed rail adapted to be fixed within a vehicle body and the second part is a fore and aft extending slide rail mounted to the fixed rail for sliding movement relative to the fixed rail in a fore and aft direction.

3. The vehicle seat of claim 1 wherein the first section is a lower generally horizontal seat cushion and the second part is a seat back extending upwardly from a rear end of the seat cushion, the seat back being mounted for rotation about a lateral axis to adjust the angular position of the seat back relative to the seat cushion.

4. The vehicle seat of claim 3 wherein the release means includes a pull cable having an outer sheath with opposite ends attached to a support structure and a wire extending therethrough with one end of the wire operably coupled to the latch member for moving the latch member to the released position and an actuating handle operably coupled to an opposite end of the wire for pulling on the wire to move the latch member to the released position; and the inertia responsive means for overriding the release means includes means for detaching one of the sheath ends from the support structure.

5. The vehicle seat of claim 4 wherein the inertia responsive means for overriding the release means includes a movable pawl engaging the one sheath end to hold the one sheath end in place and a rotating inertia member engaging the pawl to hold the pawl in place, the inertia member being rotatable to a position disengaged from the pawl in response to a vehicle collision whereby the pawl moves to release the one sheath end.

6. The vehicle seat of claim 5 wherein the inertia member rotates about an axis extending transverse to a vehicle body whereby the inertia member rotates in response to front and rear impact collisions.

7. The vehicle seat of claim 1 wherein the release means includes a pull cable, the pull cable having an outer sheath with opposite ends which are attached to a support structure and the pull cable having a wire extending through the sheath with one end of the wire operably coupled to the latch member for moving the latch member to the released position and the release means further including an actuating handle operably coupled to an opposite end of the wire for pulling on the wire to move the latch member to the released position.

8. The vehicle seat of claim 7 wherein the inertia responsive means for overriding the release means includes means for detaching one of the sheath ends from the support structure.

9. The vehicle seat of claim 8 wherein the inertia responsive means for overriding the release means includes a movable pawl engaging the one sheath end to hold the one sheath end in place and a rotating inertia member engaging the pawl to hold the pawl in place, the inertia member being rotatable to a position disengaged from the pawl in response to a vehicle collision whereby the pawl moves to release the one sheath end.

10. The vehicle seat of claim 9 wherein the one sheath end is moved by the bias means when detached from the support structure.

11. The vehicle seat of claim 9 wherein the inertia member rotates about an axis extending transverse to a vehicle body whereby the inertia member rotates in response to front and rear impact collisions.

12. The vehicle seat of claim 11 wherein the pawl is rotatable about a second transverse axis parallel to the axis of rotation of the inertia member.

13. A vehicle seat assembly comprising:

a seat cushion and a seat back;

mounting means for mounting the seat cushion and seat back in a vehicle body and for moving the seat cushion and seat back fore and aft relative to the vehicle body;

latch means for holding the seat cushion and back in place, the latch means including a latch member carried by the seat cushion and back, the latch member being movable between a latched position and a released position, the latch member engaging the mounting means in a latching relationship when in the latched position to hold the seat cushion and back in place and the latch member in being disengaged from the mounting means to enable movement of the seat cushion and back relative to the vehicle body when in the released position, the latch means including bias means for urging the latch member into the latched position;

release means for selectively moving the latch member to the released position to enable movement of the seat cushion and back relative to the vehicle body when the release means is actuated; and inertia responsive means for overriding the release means in response to a vehicle collision occurring when the release means is actuated and the latch member is in the released position, the inertia responsive means overriding the release means to enable the latch member to return to the latched position even though the release means is actuated.

14. The vehicle seat of claim 13 wherein the release means includes a pull cable having an outer sheath with opposite ends attached to a support structure and a wire extending therethrough with one end of the wire operably coupled to the latch member for moving the latch member to the released position and an actuating handle operably coupled to an opposite end of the wire for pulling on the wire to move the latch member to the released position; and the inertia responsive means for overriding the release means includes means for detaching one of the sheath ends from the support structure.

15. The vehicle seat of claim 14 wherein the inertia responsive means for overriding the release means includes a movable pawl engaging the one sheath end to hold the one sheath end in place and a rotating inertia member engaging the pawl to hold the pawl in place, the inertia member being rotatable to a position disengaged from the pawl in response to a vehicle collision whereby the pawl moves to release the one sheath end.

16. The vehicle seat of claim 15 wherein the inertia member rotates about an axis extending transverse to a vehicle body whereby the inertia member rotates in response to front and rear impact collisions.

* * * * *